United States Patent [19]

Tokuda

[11] Patent Number: 4,726,139
[45] Date of Patent: Feb. 23, 1988

[54] MOUNTING STRUCTURE FOR MOUNTING A FISHING REEL TO A FISHING ROD

[75] Inventor: Isamu Tokuda, Osaka, Japan

[73] Assignee: Shimano Industrial Company Limited, Osaka, Japan

[21] Appl. No.: 943,779

[22] Filed: Dec. 19, 1986

[30] Foreign Application Priority Data

Dec. 28, 1985 [JP] Japan ............... 60-202910[U]

[51] Int. Cl.⁴ .............................................. A01K 87/06
[52] U.S. Cl. .................................................. 43/22
[58] Field of Search ........................... 43/18.5, 22

[56] References Cited

U.S. PATENT DOCUMENTS

| | | | |
|---|---|---|---|
| 2,616,204 | 11/1952 | Bennett | 43/22 |
| 3,461,594 | 8/1969 | Ohmura | 43/22 |
| 4,057,926 | 11/1977 | Cordett | 43/18.5 |
| 4,187,633 | 2/1980 | Ohmura | 43/22 |
| 4,237,640 | 12/1980 | Sato | 43/22 |
| 4,463,512 | 8/1984 | McCreery | 43/22 |
| 4,554,755 | 11/1985 | Hsu | 43/22 |

FOREIGN PATENT DOCUMENTS

| | | | |
|---|---|---|---|
| 755302 | 3/1967 | Canada | 43/22 |
| 56-46380 | 7/1981 | Japan | |
| 1565605 | 4/1980 | United Kingdom | 43/18.5 |

*Primary Examiner*—M. Jordan
*Attorney, Agent, or Firm*—Stevens, Davis, Miller & Mosher

[57] ABSTRACT

A mounting structure for mounting on a fishing rod a fishing reel having a mounting leg. The mounting structure includes a reel seat including a seat body, a fixed holder integral with the seat body for receiving one end of the mounting leg, and a movable pusher receiving the other end of the mounting leg so that the fixed holder and movable pusher hold therebetween the mounting leg to be fixed on the seat body. The seat body is formed of a semicylindrical-shaped material. A pair of elastically deformable fitting parts elastically engaging the seat body with the fishing rod is provided integrally with the seat body. A prepreg formed of high strength fiber impregnated with synthetic resin is wound onto the fixed holder and fishing rod, thereby fixing the seat body to the fishing rod.

8 Claims, 5 Drawing Figures

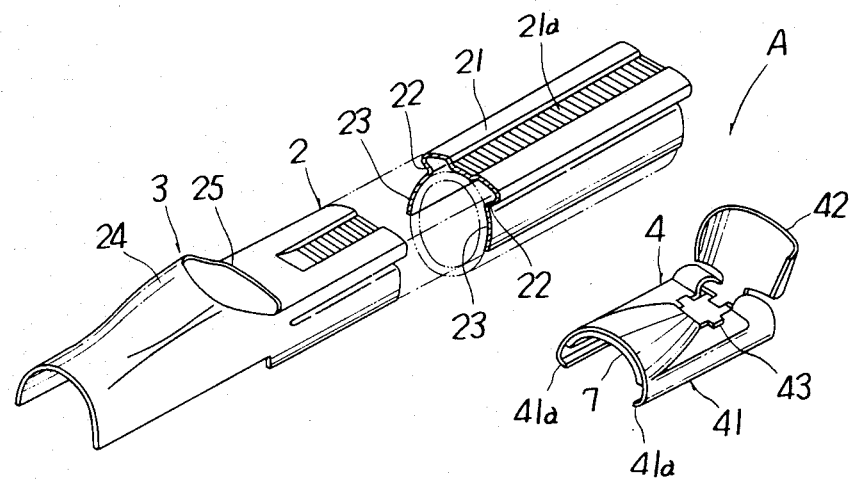
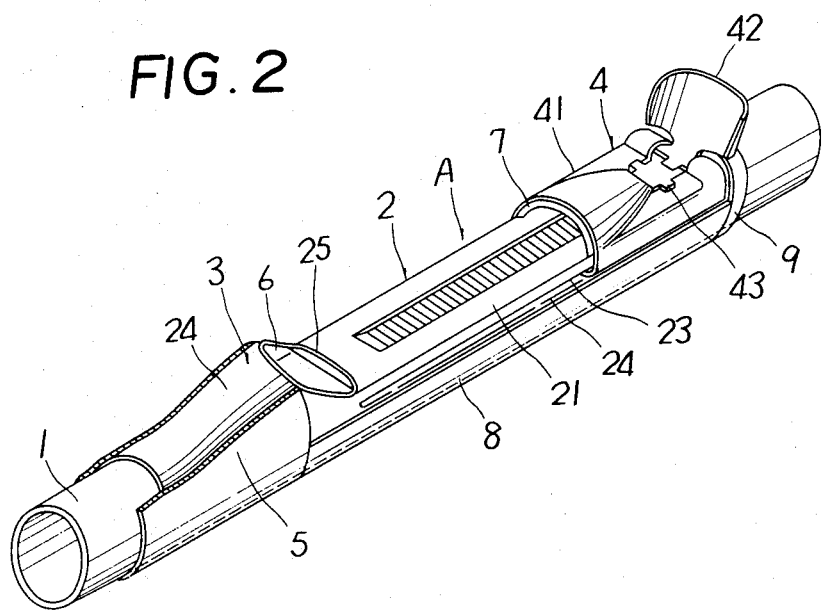

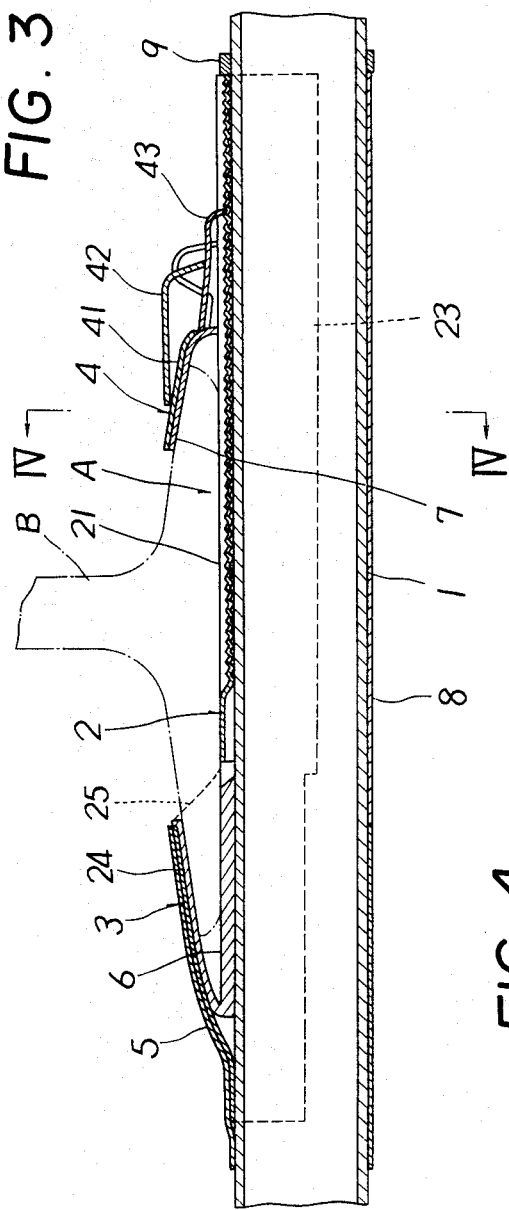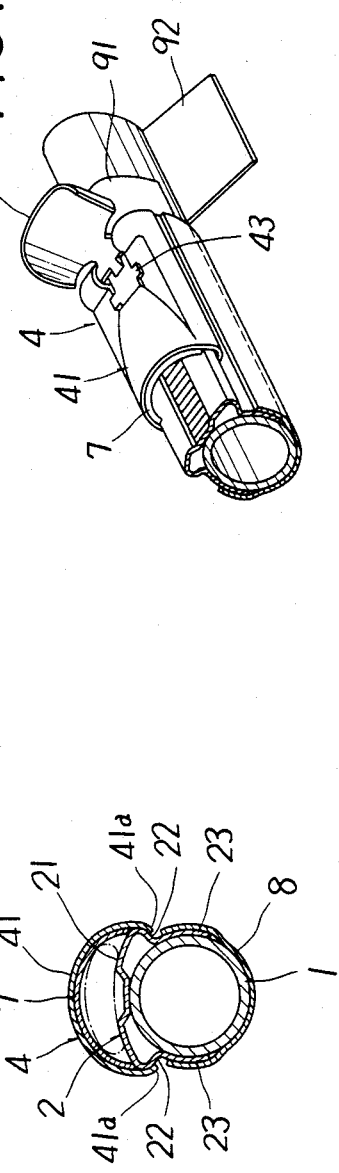

MOUNTING STRUCTURE FOR MOUNTING A FISHING REEL TO A FISHING ROD

FIELD OF THE INVENTION

The present invention relates to a mounting structure for mounting a fishing reel with a mounting leg on a fishing rod.

BACKGROUND OF THE INVENTION

Generally, a fishing reel is fixed to a fishing rod by a reel seat as disclosed in Japanese Utility Model Publication Gezette No. Sho 56-46,380. The reel seat generally comprises; a seat body which is U-substantially-shaped in cross section, extends along the fishing rod, and has a support surface for supporting a mounting leg of the fishing reel; a fixed holder for holding one end of the mounting leg; and a movable pusher for holding the other end of the same.

The seat body, fixed holder and movable pusher are separate from each other, the fixed holder being caulked to one end of the seat body, the movable pusher being movably mounted on the other end of the seat body. Also, fixing portions at both ends of the seat body are fixed onto the fishing rod through a thread to be wound around the fishing rod, so that the movable pusher moves toward the fixed holder to thereby fix the mounting leg between the fixed holder and the movable pusher.

The seat body of this type of conventional reel seat is provided at both lengthwise sides with fixing portions to the fishing rod, but the fixing portions are flat and put on one peripheral side thereof to be fixed by winding a thread. Hence, the seat body cannot be retained to the fishing rod before being wound by the thread, whereby an adhesive double coated tape must be used to temporarily fix both the fixing portions onto the rod surface, thereby creating a problem in that the reel seat fixing operation is complicated.

Also, since the seat body fixed to the fishing rod through the wound thread does not have a sufficient fixing strength, a problem is created in that the reel seat may shift circumferentially of the rod after long use.

Furthermore, the fixed holder at the seat body is separate from the seat body and fixed thereto, thereby creating a problem in that the number of parts is increased leading to high manufacturing costs.

SUMMARY OF THE INVENTION

A main object of the invention is to provide a mounting structure for mounting a fishing reel onto a fishing rod, which is readily retained onto a predetermined position of the fishing rod without using a temporary fixing material, such as an adhesive double coated tape, and which can obtain sufficient fixing strength.

Another object of the invention is to provide a mounting structure for mounting a fishing reel onto a fishing rod, which saves the number of parts of the seat body to yield low manufacturing costs.

In order to attain the above objects, the present invention has been designed and is characterized in that the seat body is formed of a semicylindrical material, a pair of fitting parts elastically engageable with the fishing rod to retain the seat body thereto are provided at the semicylindrical material, and prepreg of high strength fiber impregnated with synthetic resin is wound onto a fixed holder at the reel seat and the fishing rod, thereby fixing the seat body thereto.

The mounting structure of the invention for mounting on a fishing rod a fishing reel having a mounting leg is provided with a seat body which (1) extends lengthwise of the fishing rod, (2) is provided at one lengthwise end with a fixed holder for receiving and holding one end of the mounting leg, (3) comprises a semicylindrical material, (4) is provided at its top portion with a support surface for supporting the mounting leg, (5) has at the support surface a retaining portion, and (6) is provided at both widthwise ends with guides. A movable pusher, which receives and holds the other end of the mounting leg, is supported movably along the guide, and has a retaining means engage with the retaining portion on the support surface of the seat body to retain the pusher at a fixing position where the mounting leg is to be positioned between the fixed holder and the movable pusher and fixed therebetween; a pair of fitting parts elastically engageable with the fishing rod; the pair of filling parts are provided at both circumferantial free end portions of the seat body in continuation of the guides and are integral with the seat body and positioned to each other; and fixing means for fixing the seat body to the fishing rod and comprising prepreg of high strength fiber impregnated with synthetic resin so that the prepreg is wound around the fixed holder and fishing rod so as to fix the reel seat thereto.

Thus, the seat body provided with the pair of fitting parts elastically engageable with the fishing rod can be retained at a desired position on the fishing rod without using a temporary fixing member, such as an adhesive double coated tape as is conventional. Also, the prepreg is wound around the reel seat in condition of being retained to the fishing rod, thereby fixing the reel seat thereto. As a result, the seat body can very easily be fixed to the fishing rod to thereby improve the assembly efficiency, and the fitting parts retained to the fishing rod and prepreg wound onto the seat body and fishing rod ensure sufficient strength to fix the seat body to the fishing rod.

Furthermore, the fitting parts can be elastically deformed to be retained to the fishing rod, whereby the reel seat has a wide applicability because it is applicable to fishing rods having outer diameters of varying dimensions.

Also, since the seat body is formed of a semicylindrical-shaped material, the material is swollen at one lengthwise side and open thereat so as to enable the fixed holder to be integral with the seat body, whereby the number of parts can be reduced and a low manufacturing cost obtained.

These and other objects of the invention will become more apparent in the detailed description and examples which follow.

BRIEF DESCRIPTION OF THE DRAWINGS

FIG. 1 is a perspective exploded view of an embodiment of a mounting structure for mounting a fishing reel onto a fishing rod in accordance with the invention, in which only a reel seat is shown.

FIG. 2 is a partially cutaway perspective view of the FIG. 1 embodiment mounted on a fishing rod, FIG. 3 is a longitudinal sectional front view of the same in a condition where a mounting leg of the fishing reel is mounted on the reel seat, FIG. 4 is an enlarged sectional view taken on the line IV—IV in FIG. 3, and FIG. 5 is a perspective view in part of a modified embodiment of the invention.

DETAILED DESCRIPTION OF THE INVENTION

Referring to FIGS. 2 through 4, reference numeral 1 designates a fishing rod formed of prepreg of high strength fiber, such as carbon fiber, impregnated with synthetic resin, which is wound onto a mandrel and baked under pressure so as to be hollow, and A designates a reel seat to be fixed onto the outer surface of the fishing rod 1. The reel seat A comprises an elongated seat body 2 extending along the fishing rod 1 and having a support surface 21 for supporting a mounting leg B of the fishing reel, a fixed holder 3 for holding the mounting leg B at one end thereof, and a movable pusher 4 for holding the same at the other end thereof.

In the illustrated embodiment, the seat body 2 employs a semicylindrical-shaped material, and the fixed holder 3 is formed integrally with one lengthwise end of the seat body 2. Support surface 21 is formed at the top of the material forming seat body 2, and at both widthwise sides of the support surface 21 are provided guides 22 for guiding the movable pusher 4 movably lengthwise of the seat body 2. Seat body 2 also includes a pair of fitting parts 23 elastically engageable with the outer periphery of the fishing rod 1; fitting parts 23 are formed of extensions extending downwardly from the guides 22 respectively, so that the seat body 2 is elastically retained to the outer periphery of the fishing rod 1. Prepreg of high strength fiber impregrated with synthetic resin is wound around the fixed holder 3 and fishing rod 1, thereby fixing the seat body 2 onto the outer surface of the fishing rod 1.

In detail, the seat body 2 is formed of a thin metal plate of a semicylindrical shape and recessed inwardly at both widthwise sides to form the guides 22 respectively. Fitting parts 23 are formed at both circumferential free end portions of the seat body 2 and are integral therewith and the continuation of the guides 22 respectively. Also, the fitting parts 23 are elastically deformed corresponding to the outer surface of the fishing rod 1 so as to fit and retain the reel seat 2 thereto. In addition, it is preferable that the fitting parts 23 fit to the outer surface of fishing rod 1 at a length larger than a half circumference thereof in the state where the rear surface of the support surface 21 is kept in contact with the fishing rod 1.

Also, the seat body 2 may be molded of synthetic resin (FRP) reinforced with high strength fiber, such as carbon fiber, instead of the abovementioned metal plate.

The fixed holder 3, when the seat body 2 is molded, is provided at one lengthwise end of its material with a swollen portion 24 swollen radially outwardly from the seat body 2 and integral therewith and having an opening 25 open at the swollen portion 24, so that the mounting leg B is insertable at one end thereof into the swollen portion 24 through the opening 25. In addition, a free end of the swollen portion 24 is formed in a semicylinder curved along the outer surface of fishing rod 1 so as to abut thereagainst when the seat body 2 is fixed to the fishing rod 1. Also, a buffer 6 synthetic resin is interposed between the rear surface of fixed holder 3 and the outer surface of fishing rod 1.

The prepreg 5 for fixing the seat body 2 to the fishing rod 1, as shown in FIGS. 2 and 3, is wound onto the surface of fixed holder 3 and the outer surface of fishing rod 1, and a cellophane tape is wound onto the wound prepreg, so that the fishing rod 1 is applied with pressure, heated under pressure in a heating furnace, and hardened of synthetic resin, thereby fixing the fixed holder 3 to the fishing rod 1. The cellophane tape is peeled off after the reel seat 2 is fixed.

The movable pusher 4 comprises a base 41 having a pair of engaging portions 41a engageable with the guides 22 at the seat body 2 respectively, an operating lever 42 pivoted to the base 41, and a retainer 43 which is operated by the operating lever 42 so as to be retained to an engaging portion 21a formed of serrations on the support surface 21. Engaging portions 41a are fitted into the guides 22 from the free end of the seat body 2 so as to engage therewith. Also, a buffer 7 of synthetic resin is attached to the rear surface of base 41.

In addition, it is preferable that the fitting parts 23 at the seat body 2 are fixed to the outer surface of the fishing rod 1 through prepreg 8 of high strength fiber impregnated with synthetic resin. In this case, the prepreg 8 is applied across the fitting parts 23, and a cellophane tape is wound on the surface of prepreg 8 and the surface of seat body 2. Also, prepreg 8 is pressurized and heated under pressure in a heating furnace to harden the synthetic resin in the prepreg 8, thereby fixing the fitting parts 23 to the fishing rod 1. Also, in this case, a widthwise length of the support surface 21 of the seat body 2 is made smaller than a maximum interval between the outer surfaces of fitting parts 23, thereby applying pressure onto the prepreg 8 by winding the cellophane tape. In addition, the cellophane tape is peeled off after the fitting parts 23 are fixed to the fishing rod 1.

Also, in the drawing, reference numeral 9 designate a substantially ring-shaped fixture onto the outer periphery of fishing rod 1 by a fixing means, such as an adhesive, to thereby prevent the movable pusher 4 from becoming loose from the seat body 2.

The reel seat A of the invention constructed as described above, is mounted on the fishing rod 1 such that the fitting parts 23 at the seat body 2 integral with the fixed holder 3 are fitted onto the outer surface of the fishing rod 1 from a radial direction outside rod 1 to thereby retain the seat body 2 to the rod, and the prepreg 5 is wound across the outer surface of fixed holder 3 and the outer surface of fishing rod 1. Prepreg 8 is wound between the fitting parts 23. As a result, fixed holder 3 and seat body 2 are fixed onto the fishing rod 1 by means of the prepregs 5 and 8. The engaging portions 41a at the base 41 of the movable pusher 4 are fitted into the guides 22 from the free end of the seat body 2 respectively, thereby supporting the movable pusher 4 lengthwise movably of the seat body 2. Meanwhile, the fixture 9 is fitted onto the fishing rod 1 and fixed thereto by the fixing means, such as an adhesive, to thereby prevent the movable pusher 4 from working loose from the seat body 2.

The seat body 2 integral with the fixed holder 3 is merely fitted onto the fishing rod 1 so as to be retained thereto without using a temporary fixture, such as an adhesive double coated tape, and the prepregs 5 and 8 can simply and readily fix to the fishing rod 1 the seat body 2 as it is. Also, the fitting parts 23 thereof can elastically open corresponding to any outer diameter of the fishing rod 1, whereby reel seat A is applicable to a wide range of rod sizes.

Furthermore, the fixing of reel seat 2 by the prepreg and the retaining of fitting parts 23 onto the fishing rod 1 can largely increase the fixing strength in comparison with the conventional example.

The fishing reel is mounted on the reel seat A at the fishing rod 1 such that the front end of the mounting leg B at the fishing reel is inserted into the buffer 6 at the fixed holder 3, and the mounting leg B is put on the support surface 21 at the reel seat 2. Also, movable pusher 4 is moved forwardly to hold by the buffer 7 the mounting leg B at the rear end thereof, and the mounting leg is pressed by the movable pusher 4 toward the center of fishing rod 1 and fixed thereto.

Alternatively, the fitting parts 23 need not necessarily be fixed to the fishing rod 1. Also, the prepreg 8 for fixing the fitting parts 23 may be integral with the prepreg 5 for fixing the fixed holder 3.

Alternatively, a fixing part 91 integral with the seat body 2, as shown in FIG. 5, may be used instead of the substantially ring-shaped fixture 9. In this embodiment, fixing part 91 is formed at one lengthwise end of seat body 2 opposite to the fixed holder 3 and prepreg 92 of high strength fiber impregnated with synthetic resin is wound onto the fixture 91 and fishing rod 1, thereby fixing the fixture 91 thereto.

While an embodiment of the invention has been shown and described, the invention is not limited to the specific construction thereof, the embodiment described in the specification is merely exemplary of the invention and the scope of the invention is not limited thereto.

What is claimed is:

1. A mounting structure for mounting a fishing reel with a mounting leg on a fishing rod, said mounting structure comprising:

(a) an elongated seat body adapted to extend lengthwise of said fishing rod and comprising at one lengthwise end a fixed holder for receiving and fixing one end of said mounting leg, said seat body comprising a material having a substantially semicylindrical shape including at its top portion a support surface for supporting said mounting leg, the support surface including a retainer portion, said seat body having guides at both widthwise sides thereof, (b) a movable pusher for receiving and holding another end of said mounting leg, said pusher being supported movably on said seat body and guided by said guides, said pusher having retaining means for engagement with said retainer portion on said support surface to retain said pusher at a fixing position where said mounting leg is adapted to be positioned and fixed between said fixed holder and said pusher;

(c) a pair of elastically deformable fitting parts for elastically engaging said seat body with said fishing rod to hold said fishing rod on said seat body, said fitting parts extending from circumferential free end portions of said seat body toward said top portion of said seat body in continuation of said guides and being positioned opposite to each other circumferentially of said substantially semicircular material of said seat body, and (d) fixing means for fixing said seat body onto said fishing rod, comprising prepreg of high strength fiber impregnated with synthetic resin, said prepreg for being wound onto said fixed holder and fishing rod to thereby fix said seat body to said fishing rod.

2. A mounting structure according to claim 1, wherein said seat body is provided at one lengthwise end of said semicylindrical material with a swollen portion swollen radially outwardly from said material, said swollen portion having an opening for receiving a mounting segment of said mounting leg, said fixed holder being integral with said seal body.

3. A mounting structure according to claim 1, wherein said seat body is provided at its other lengthwise end with a movement restraining means for restraining said seat body from moving axially with respect to said fishing rod.

4. A mounting structure according to claim 3, wherein said movement restraining means is a substantially ring-shaped fixture to be fixed onto said fishing rod.

5. A mounting structure according to claim 3, wherein said movement restraining means comprises a fixture integral with said seat body and a fixing means for fixing said fixture to said fishing rod.

6. A mounting structure according to claim 5, wherein said fixing means comprises prepreg of high strength fiber impregnated with synthetic resin, said prepreg for being wound around said fixture and said fishing rod to fix said fixture to said fishing rod.

7. A mounting structure according to claim 1, further comprising a fixing means for fixing said fitting parts of said seat body onto said fishing rod.

8. A mounting structure according to claim 7, wherein said fixing means comprises prepreg of high strength fiber impregnated with synthetic resin, said prepreg being superposed upon said fitting parts to be coupled with said fishing rod.

* * * * *